US008826001B2

(12) United States Patent
Betz et al.

(10) Patent No.: US 8,826,001 B2
(45) Date of Patent: Sep. 2, 2014

(54) SECURING INFORMATION WITHIN A CLOUD COMPUTING ENVIRONMENT

(75) Inventors: Linda N. Betz, Poughkeepsie, NY (US); Wesley J. Ho, San Francisco, CA (US); Charkes S. Lingafelt, Durham, NC (US); David P. Merrill, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/768,106

(22) Filed: Apr. 27, 2010

(65) Prior Publication Data

US 2011/0264907 A1  Oct. 27, 2011

(51) Int. Cl.
*H04L 9/00* (2006.01)

(52) U.S. Cl.
USPC .............. 713/153; 713/160; 713/162; 705/51

(58) Field of Classification Search
USPC .............................. 713/153, 160, 162; 705/51
See application file for complete search history.

(56) References Cited

U.S. PATENT DOCUMENTS

| | | | |
|---|---|---|---|
| 6,584,564 | B2 | 6/2003 | Olkin et al. |
| 6,745,231 | B1 | 6/2004 | Megiddo |
| 7,152,159 | B2 | 12/2006 | Toyota et al. |
| 8,132,073 | B1 * | 3/2012 | Bowers et al. ............... 714/755 |
| 8,601,598 | B2 * | 12/2013 | Ozzie et al. .................. 726/27 |
| 2002/0178353 | A1 | 11/2002 | Graham |
| 2007/0005713 | A1 | 1/2007 | LeVasseur et al. |
| 2007/0174636 | A1 | 7/2007 | Raja |
| 2008/0080718 | A1 | 4/2008 | Meijer et al. |
| 2008/0083036 | A1 | 4/2008 | Ozzie et al. |
| 2008/0098237 | A1 | 4/2008 | Dung et al. |
| 2008/0235175 | A1 | 9/2008 | Olive |
| 2008/0320319 | A1 * | 12/2008 | Muller et al. ................. 713/193 |
| 2009/0097662 | A1 | 4/2009 | Olechowski et al. |
| 2010/0241731 | A1 * | 9/2010 | Du et al. ....................... 709/218 |
| 2011/0016214 | A1 * | 1/2011 | Jackson ........................ 709/226 |

FOREIGN PATENT DOCUMENTS

WO  02/09346 A1  1/2002

OTHER PUBLICATIONS

T. Dierks et al. "RFC 2246: The TLS Protocol Version 1.0" © 1999 The Internet Society (80 pages) http://www.rfc-editor.org/rfc/pdfrfc/rfc2246.txt.pdf.*

Steve Gibson & Leo Laporte. "Security Now! Transcript of Episode #123: Jungle Disk" Originally broadcast Dec. 20, 2007 (15 pages) http://www.grc.com/sn/sn-123.pdf.*

(Continued)

*Primary Examiner* — Darren B Schwartz
*Assistant Examiner* — Thomas Gyorfi
(74) *Attorney, Agent, or Firm* — William E. Schiesser; Keohane & D'Alessandro PLLC

(57) ABSTRACT

Embodiments of the invention provide a solution for securing information within a Cloud computing environment. Specifically, an encryption service/gateway is provided to handle encryption/decryption of information for all users in the Cloud computing environment. Typically, the encryption service is implemented between Cloud portals and a storage Cloud. Through the use of a browser/portal plug-in (or the like), the configuration and processing of the security process is managed for the Cloud computing environment user by pointing all traffic for which security is desired to this encryption service so that it can perform encryption (or decryption in the case of document retrieval) as needed (e.g., on the fly) between the user and the Cloud.

32 Claims, 9 Drawing Sheets

EMBODIMENT A: CENTRAL ENCRYPTION FUNCTION HAVING DIRECT CONNECTION TO EXTERNAL STORAGE

(56) References Cited

OTHER PUBLICATIONS

"Jungle Disk makes it easy to store files securely online" Published Nov. 20, 2007 as verified by the Internet Archive (2 pages) http://web.archive.org/web/20071120064352/http://www.jungledisk.com/howitworks.shtml.*

"Comparing Jungle Disk to other online storage services" Published Nov. 18, 2007 as verified by the Internet Archive (4 pages) http://web.archive.org/web/20071118045435/http://www.jungledisk.com/compare.shtml.*

"Jungle Disk Frequently Asked Questions" Published Nov. 22, 2007 as verified by the Internet Archive (6 pages) http://web.archive.org/web/20071122005107/http://www.jungledisk.com/faq.shtml.*

Steve Gibson with Leo Laporte. "Security Now! Transcript of Episode #123: Jungle Disk" Originally broadcast Dec. 20, 2007 (15 pages) Transcript at http://www.grc.com/sn/sn-123.pdf Audio at http://twit.tv/show/security-now/123 and http://media.grc.com/sn/sn-123.mp3.*

Steve Gibson with Leo Laporte. "Security Now! Episode 245: The Security of Open vs. Closed" Originally broadcast Apr. 22, 2010 (22 pages) Transcript: http://www.grc.com/sn/sn-245.pdf Audio/Video: http://twit.tv/show/security-now/245 and http://media.grc.com/sn/sn-245.mp3.*

"StorSimple Solution for Microsoft File Servers Solution Brief" Publication date of Apr. 8, 2010 as verified by Google (2 pages) http://www.storsimple.com/Portals/65157/docs/storsimple-solution-brief-fileservers-rev4.pdf.*

Rob Mason. "Data Security and the Nasuni Filer: Just the Facts" Published Mar. 15, 2010 (4 pages) http://www.nasuni.com/blog/120-data_security_and_the_nasuni_filer-just_the_facts.*

Gary Orenstein. "Show Me the Gateway—Taking Storage to the Cloud" Published Jun. 22, 2010 (7 pages) http://gigaom.com/2010/06/22/show-me-the-gateway-taking-storage-to-the-cloud/.*

"Homeserver—How It Works" "What is Windows Home Server?" article dated Jul. 8, 2008 as verified by the Internet Archive (1 page) http://web.archive.org/web/20080708013258/http://www.jungledisk.com/homeserver/how.aspx.*

T. Berners-Lee et al. "RFC 1738: Uniform Resource Locators (URL)" Published Dec. 1994 (25 pages) https://tools.ietf.org/pdf/rfc1738.*

Maitland, J., "Keeping Control Isn't Easy", Chapter 4: Cloud-Based Infrastructure, SearchCloudComputing.com, 13 pages.

Mell, P. et al., "The NIST Definition of Cloud Computing", National Institute of Standards and Technology, Information Technology Laboratory, Version 15, Oct. 7, 2009, 2 pages.

* cited by examiner

EMBODIMENT B: CENTRAL ENCRYPTION FUNCTION HAVING INDIRECT CONNECTION TO EXTERNAL STORAGE

SECURING INFORMATION WITHIN A CLOUD COMPUTING ENVIRONMENT

TECHNICAL FIELD

The present invention relates to information security. Specifically, the present invention relates to information security within a Cloud computing environment.

BACKGROUND

The Cloud computing environment is an enhancement to the predecessor grid environment, whereby multiple grids and other computation resources may be further abstracted by a Cloud layer, thus making disparate devices appear to an end-user as a single pool of seamless resources. These resources may include such things as physical or logical compute engines, servers and devices, device memory, storage devices, networks, business applications and other software, and the like.

As enterprises seek more cost effective/inexpensive services, many are considering the use of third party mail and storage solutions. One of the challenges in adopting enterprise use of such a service for business is the potential lack of security to sensitive data and intellectual property that may exist while data is in storage away from the enterprise's physical security controls.

SUMMARY

Embodiments of the invention provide a solution for securing information within a Cloud computing environment. Specifically, an encryption service/gateway is provided to handle encryption/decryption of information for all users in the Cloud computing environment. Typically, the encryption service is implemented between Cloud portals and a storage Cloud. Through the use of a browser/portal plug-in (or the like), the configuration and processing of the security process is managed for the Cloud computing environment user by pointing all traffic for which security is desired to this encryption service so that it can perform encryption (or decryption in the case of document retrieval) as needed (e.g., on the fly) between the user and the Cloud.

A first aspect of the present invention provides a method for securing information within a Cloud computing environment, comprising: receiving a communication containing information to be secured from an endpoint at a central encryption service; encrypting the information at the central encryption service; and communicating the encrypted information to a Cloud storage system from the central encryption service.

A second aspect of the present invention provides a system for securing information within a Cloud computing environment, comprising: a memory medium comprising instructions; a bus coupled to the memory medium; and a processor coupled to the bus that when executing the instructions causes the system to: receive a communication containing information to be secured from an endpoint at a central encryption service; encrypt the information at the central encryption service; and communicate the encrypted information to a Cloud storage system from the central encryption service.

A third aspect of the present invention provides a computer readable medium containing a program product for securing information within a Cloud computing environment, the computer readable medium comprising program code for causing a computer to: receive a communication containing information to be secured from an endpoint at a central encryption service; encrypt the information at the central encryption service; and communicate the encrypted information to a Cloud storage system from the central encryption service.

A fourth aspect of the present invention provides a method for deploying an application for securing information within a Cloud computing environment, comprising: providing a computer infrastructure being operable to: receive a communication containing information to be secured from an endpoint at a central encryption service; encrypt the information at the central encryption service; and communicate the encrypted information to a Cloud storage system from the central encryption service.

A fifth aspect of the present invention provides a method for securing information within a Cloud computing environment, comprising: receiving a communication containing information to be secured from an endpoint at a central encryption service; encrypting the information at the central encryption service; communicating the encrypted information to the endpoint from the central encryption service; and communicating the encrypted information from the endpoint to a Cloud storage system for storage.

A sixth aspect of the present invention provides a system for securing information within a Cloud computing environment, comprising: a memory medium comprising instructions; a bus coupled to the memory medium; and a processor coupled to the bus that when executing the instructions caused the system to: receive a communication containing information to be secured from an endpoint at a central encryption service; encrypt the information at the central encryption service; communicate the encrypted information to the endpoint from the central encryption service; and communicate the encrypted information from the endpoint to a Cloud storage system for storage.

A seventh aspect of the present invention provides a computer readable medium containing a program product for securing information within a Cloud computing environment, the computer readable medium comprising program code for causing a computer to: receive a communication containing information to be secured from an endpoint at a central encryption service; encrypt the information at the central encryption service; communicate the encrypted information to the endpoint from the central encryption service; and communicate the encrypted information from the endpoint to a Cloud storage system for storage.

An eighth aspect of the present invention provides a method for deploying an application for securing information within a Cloud computing environment, comprising: providing a computer infrastructure being operable to: receive a communication containing information to be secured from an endpoint at a central encryption service; encrypt the information at the central encryption service; communicate the encrypted information to the endpoint from the central encryption service; and communicate the encrypted information from the endpoint to a Cloud storage system for storage.

BRIEF DESCRIPTION OF THE DRAWINGS

These and other features of this invention will be more readily understood from the following detailed description of the various aspects of the invention taken in conjunction with the accompanying drawings in which.

Figure 1:
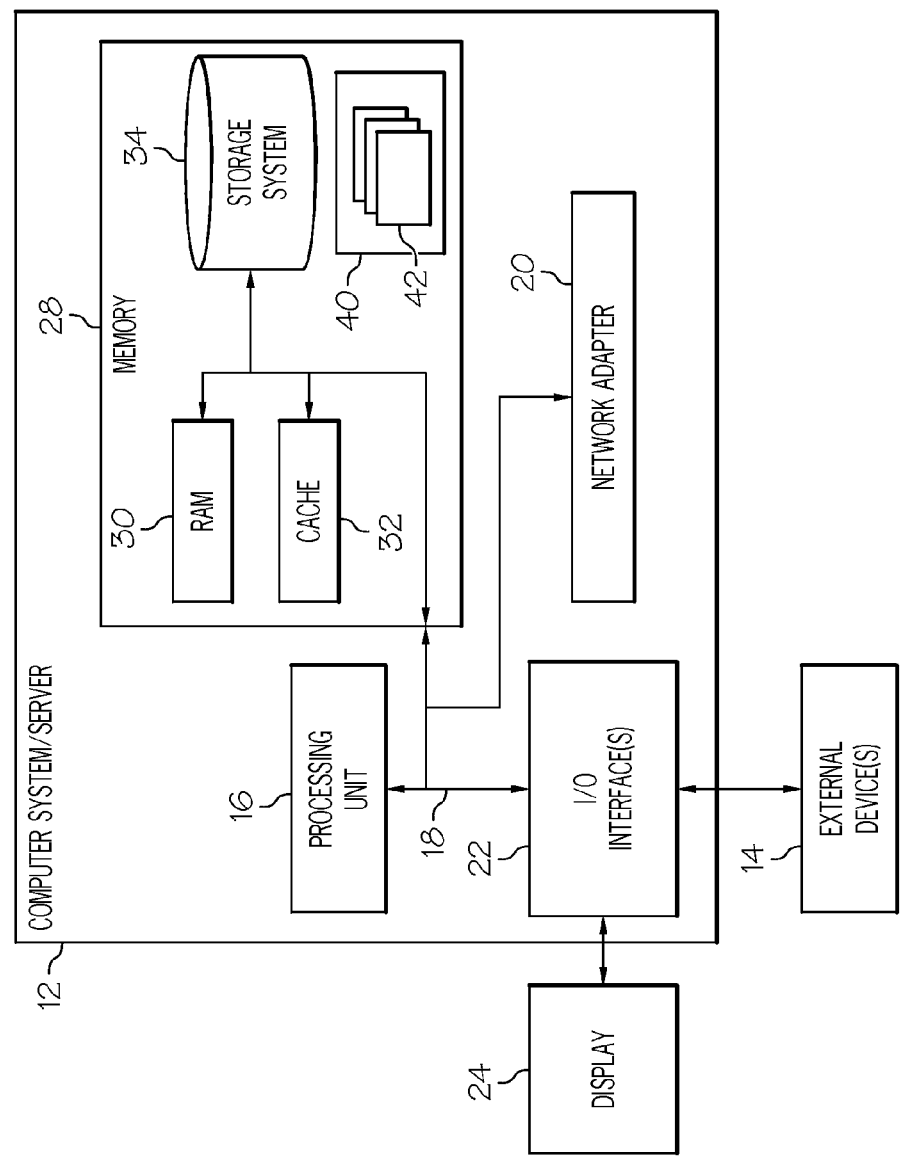
FIG. 1 depicts a Cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:
I. Cloud Computing Definitions
II. Detailed Implementation of Embodiments of the Invention I. Cloud Computing Definitions The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed, automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models are as follows:

Cloud Software as a Service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly applications hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models are as follows:

Private Cloud: The Cloud infrastructure is operated solely for an organization. It may be managed by the organization or a third party and may exist on-premises or off-premises.

Community Cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load balancing between Clouds).

A Cloud computing environment is service oriented with a focus on statelessness, low coupling, modularity, and semantic interoperability.

II. Detailed Implementation of Embodiments of the Invention

Embodiments of the invention provide a solution for securing information within a Cloud computing environment. Specifically, an encryption service/gateway is provided to handle encryption/decryption of information for all users in the enterprise. Typically, the encryption service is implemented between the enterprise and the storage Cloud. Through the use of a browser plug-in (or the like), the configuration and processing of the security process is managed for the enterprise user by pointing all traffic for which security is desired to this encryption service so that it can perform encryption (or decryption in the case of document retrieval) as needed (e.g., on the fly) between the user and the Cloud.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in Section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media and removable and non-removable media.

System memory 28 can include computer system readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EFROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wire line, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
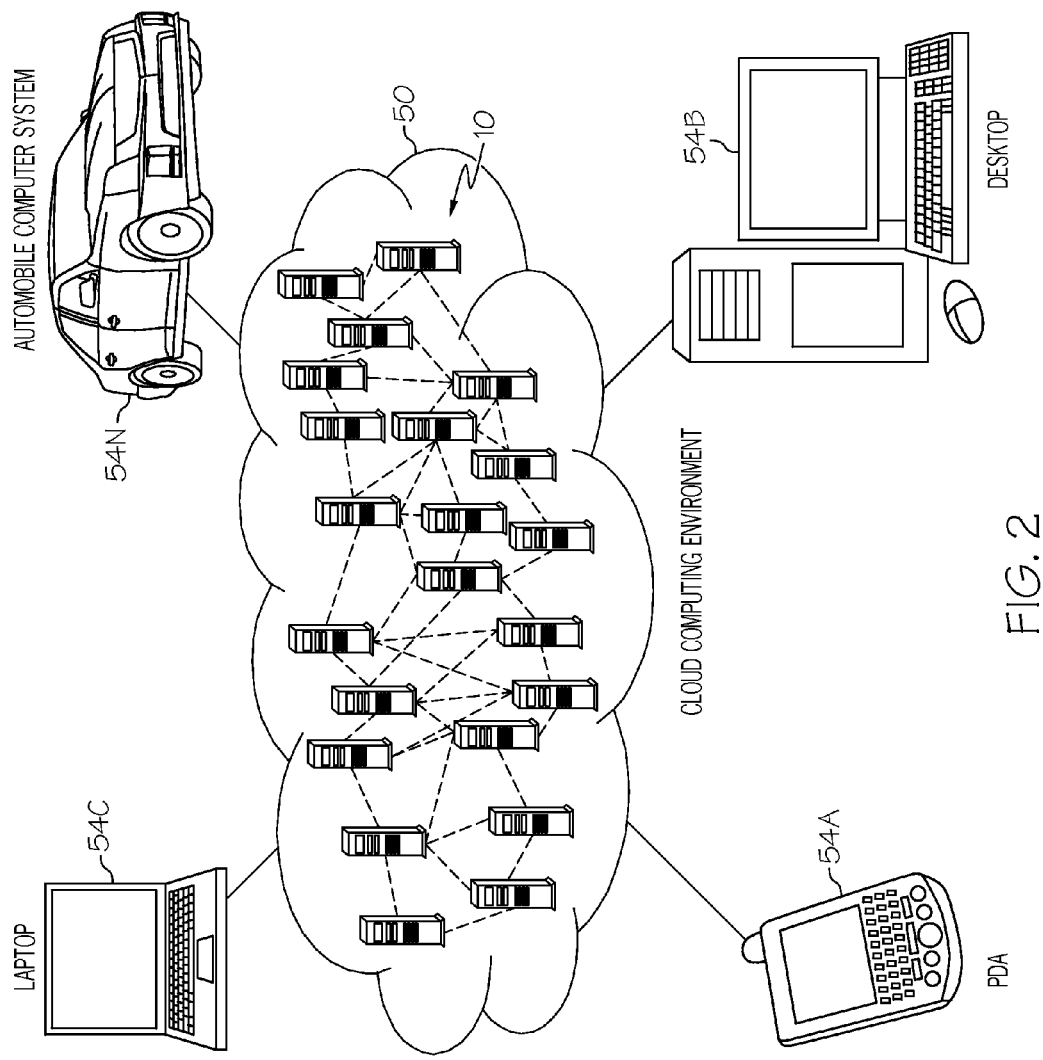
FIG. 2 depicts a Cloud computing environment according to an embodiment of the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from Cloud computing environment 50, so that each client does not have to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
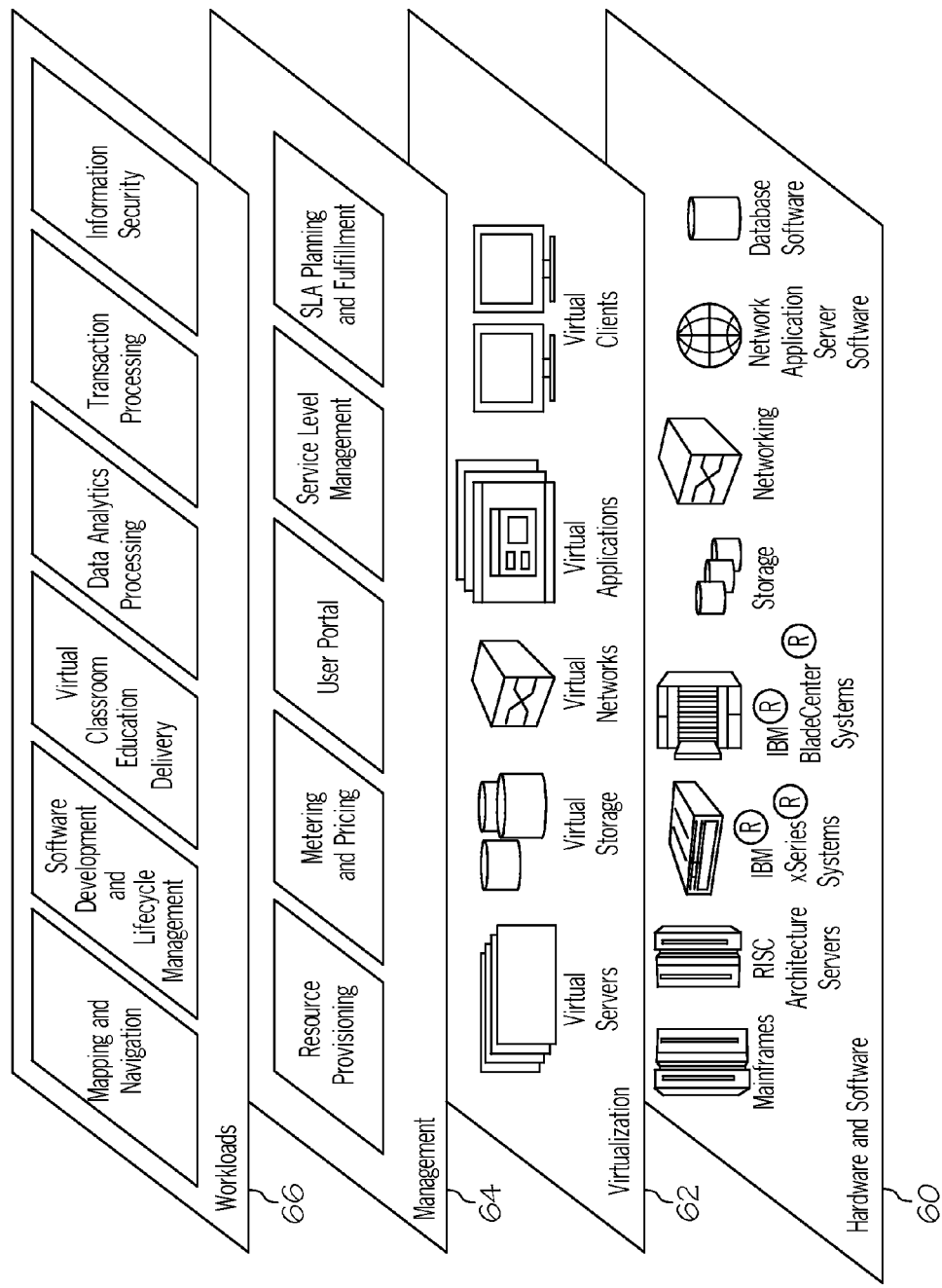
FIG. 3 depicts Cloud abstraction model layers according to an embodiment of the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems; IBM xSeries® systems; IBM BladeCenter® systems; storage devices; networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual operating system (s); virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for consumers/users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and information security. As mentioned above, all of the foregoing examples described with respect to FIG. 3 are illustrative only, and the invention is not limited to these examples.

It is understood all functions of the present invention as described herein are typically performed by instance starting, which can be tangibly embodied as modules of program code 42 of program/utility 40 (FIG. 1).

Figure 4:
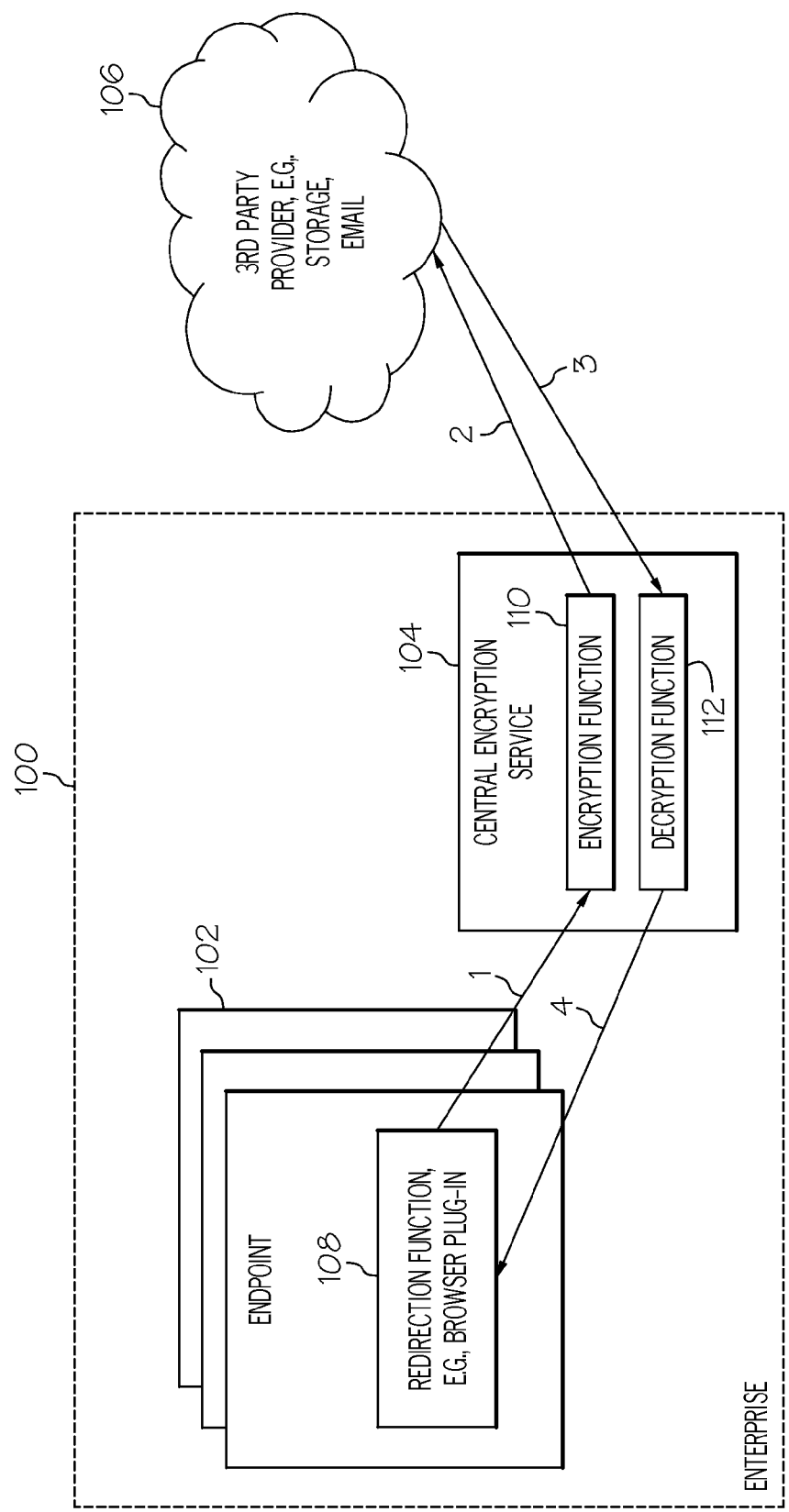
FIG. 4 depicts a system for securing information within a Cloud computing environment according to an embodiment of the present invention.

In general, the present invention can be embodied in at least two forms: Embodiment A: Central Encryption Function Direct Connection to External Storage; and Embodiment B: Central Encryption Function Indirect Connection to External Storage. In either form, the Central Encryption service is typically implemented by a trusted third party entity Embodiment A is shown in FIG. 4. Under this embodiment, the central encryption facility sends the encrypted information directly to the external storage and retrieves it from the external storage. Specifically, FIG. 4 shows an endpoint 102 and a central protection/encryption service/site (CES 104) within an enterprise 100. It should be noted that CES 104 need not be a part of enterprise 100. Rather, it could be external to enterprise 100, similar to Cloud storage system (CSS 106). In any event, CSS 106 can represent any type of third party Cloud-based storage system. Regardless, as further shown, endpoint 102 can comprise a specially configured browser 108 that includes a plug-in or the like for redirecting traffic to CES 104 in accordance with the teachings recited herein (and as will be further explained below in conjunction with FIGS. 5-6). CES 104 comprises an encryption function 110 and a decryption function 112 for providing information security hereunder.

Under this embodiment, information/content (e.g., documents, emails, etc.) that are desired to be protected will be communicated to CES 104 from endpoint 102 via a redirection function, such as plug-in of browser 108. For those skilled in the art, it is apparent that this redirection function can be embodied in a variety of ways, such as a browser plug-in, java bean, an independent program. The use of the description "plug-in of browser" should in no way be viewed as restricting the embodiment of the redirection function and the list given is not an exhaustive of the methods of embodiment for this redirection function. CES 104 will then encrypt the information (e.g., using a set of previously received encryption keys), and then communicate the encrypted information to CSS 106 (arrow 2). When the information is later needed, endpoint 102 will furnish a request for the same to CES 104, which will retrieve the encrypted information for CSS 106 (arrow 3), decrypt it using a set of previously received decryption keys, and then communicate the decrypted information back to endpoint 102 (arrow 4).

Figure 5:
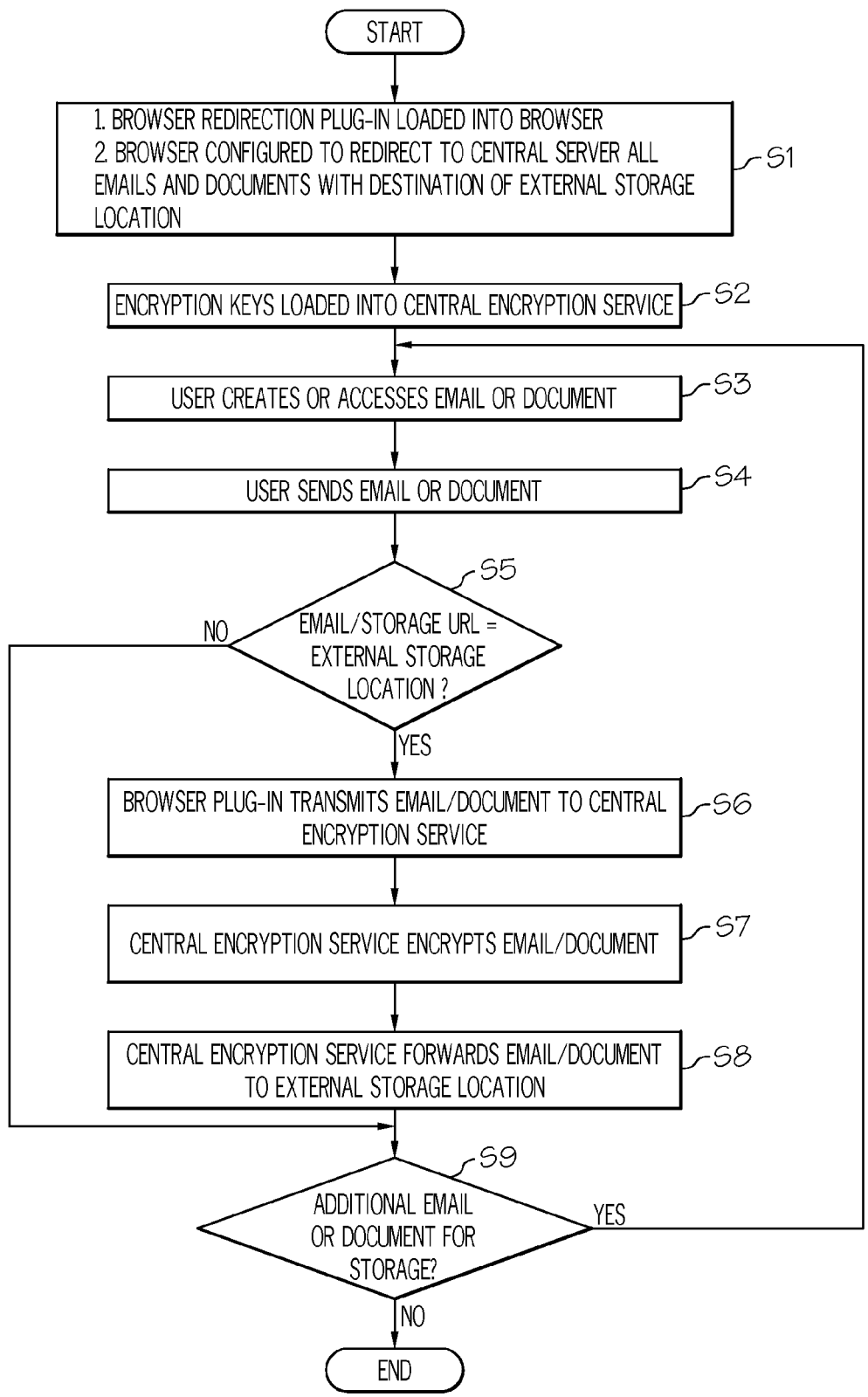
FIG. 5 depicts a method flow diagram of an encryption process under the system of FIG. 4
Figure 6:
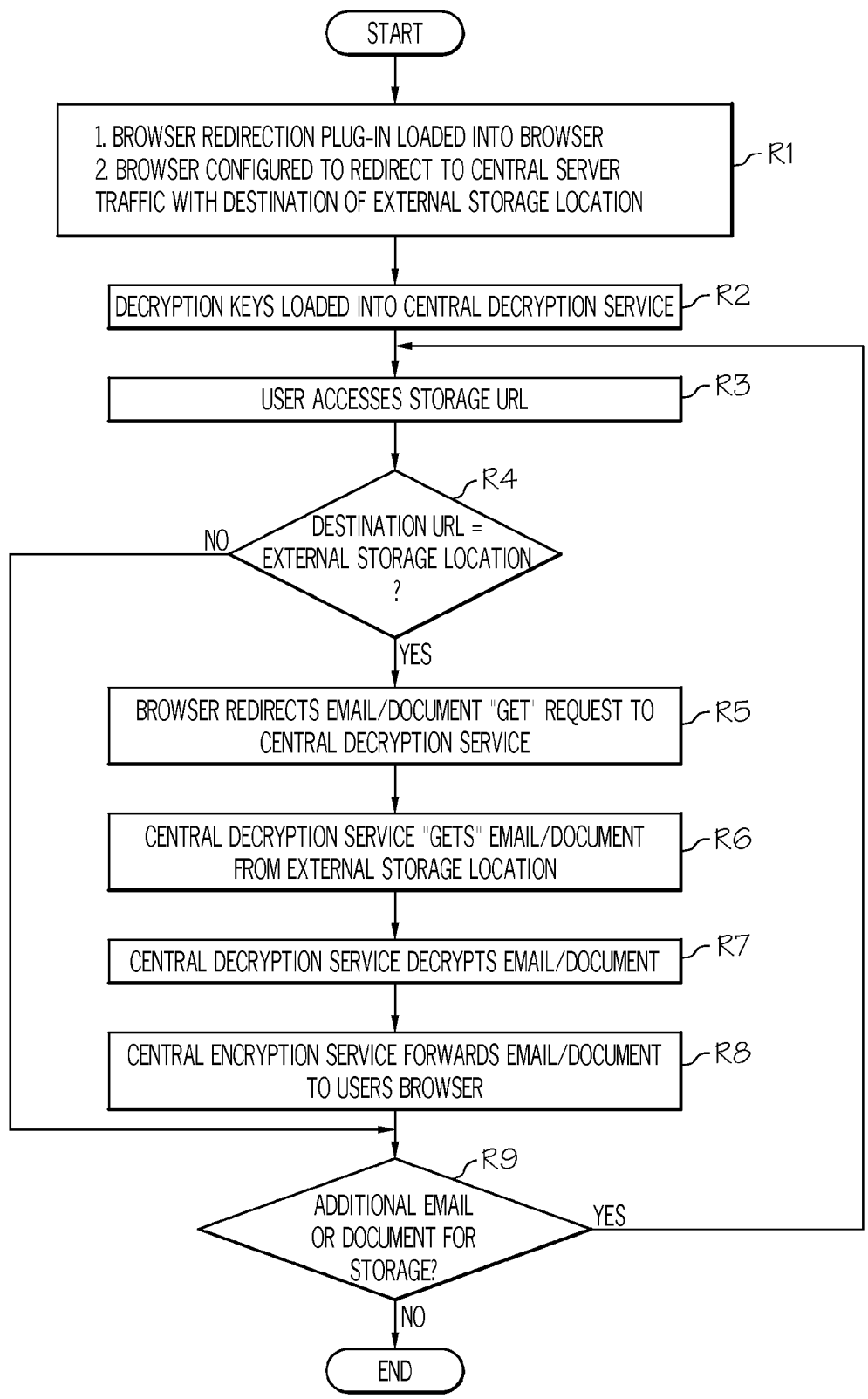
FIG. 6 depicts a method flow diagram of a decryption process under the system of FIG. 4.

A more detailed example of encryption and description is shown in the method flow diagrams of FIGS. 5 and 6, respectively. Referring first to FIG. 5 (Embodiment A: Encryption), in step S1, the "browser redirection" plug-in is loaded into the browser and is configured to redirect to the CES all emails, electronic documents, etc. (information) with a destination of the CSS. In step S2, encryption keys are loaded into the CES. In step S3, the user creates or accesses an email or document. In step S4, the user sends the email or document. In step S5, it is determined whether the storage URL references the CSS. If not, the process flows to step S9. If so, the browser plug-in transmits the email/document to the CES in step S6. In step S7, the CES encrypts the email/document using the encryption keys, and in step S8, the CES forwards the encrypted email/document to the CSS. In step S9, it is determined whether additional information needs to be secured. If not, the process ends. If so, the process returns to step S3. For those skilled in the art, it is apparent that this redirection function, performing the functions of S6, can be embodied in a variety of ways, such as a browser plug-in, java bean, an independent program. The use of the description "plug-in of browser" should in no way be viewed as restricting the embodiment of the redirection function and the list given is not exhaustive of the methods of embodiment for this redirection function. For those skilled in the art, it is apparent that other forms of information object reference, in addition to URL may be used, such as IP address. The use of the term URL should not be viewed as restricting the embodiment of the information object reference to a URL.

Referring now to FIG. 6 (Embodiment A: Decryption), in step R1, the "browser redirection" plug-in is loaded into the browser and is configured to redirect to the CES all emails, electronic documents, etc. (information) with a destination of the CSS. In step R2, decryption keys are loaded into the CES. In step R3, the user accesses a Uniform Resource Locator (URL). In step S4, it is determined whether it matched the CSS. If not, the process flows to step R9. If so, the browser redirects the "get" request to the CES in step S5. In step R6, the CES retrieves the requested email/document from the CSS. In step R7, the CES decrypts the same using the decryption keys. In step S8, the CES sends the decrypted email/document to the browser. In step R9, it is determined whether additional information is being requested. If not, the process ends. If so, the process returns to step R3. For those skilled in the art, it is apparent that this redirection function, performing the functions of R5 and R9 can be embodied in a variety of ways, such as a browser plug-in, java bean, an independent program. The use of the description "plug-in of browser" should in no way be viewed as restricting the embodiment of the redirection function and the list given is not exhaustive of the methods of embodiment for this redirection function. For those skilled in the art, it is apparent that other forms of information object reference, in addition to URL may be used, such as IP address. The use of the term URL should not be viewed as restricting the embodiment of the information object reference to a URL.

Figure 7:
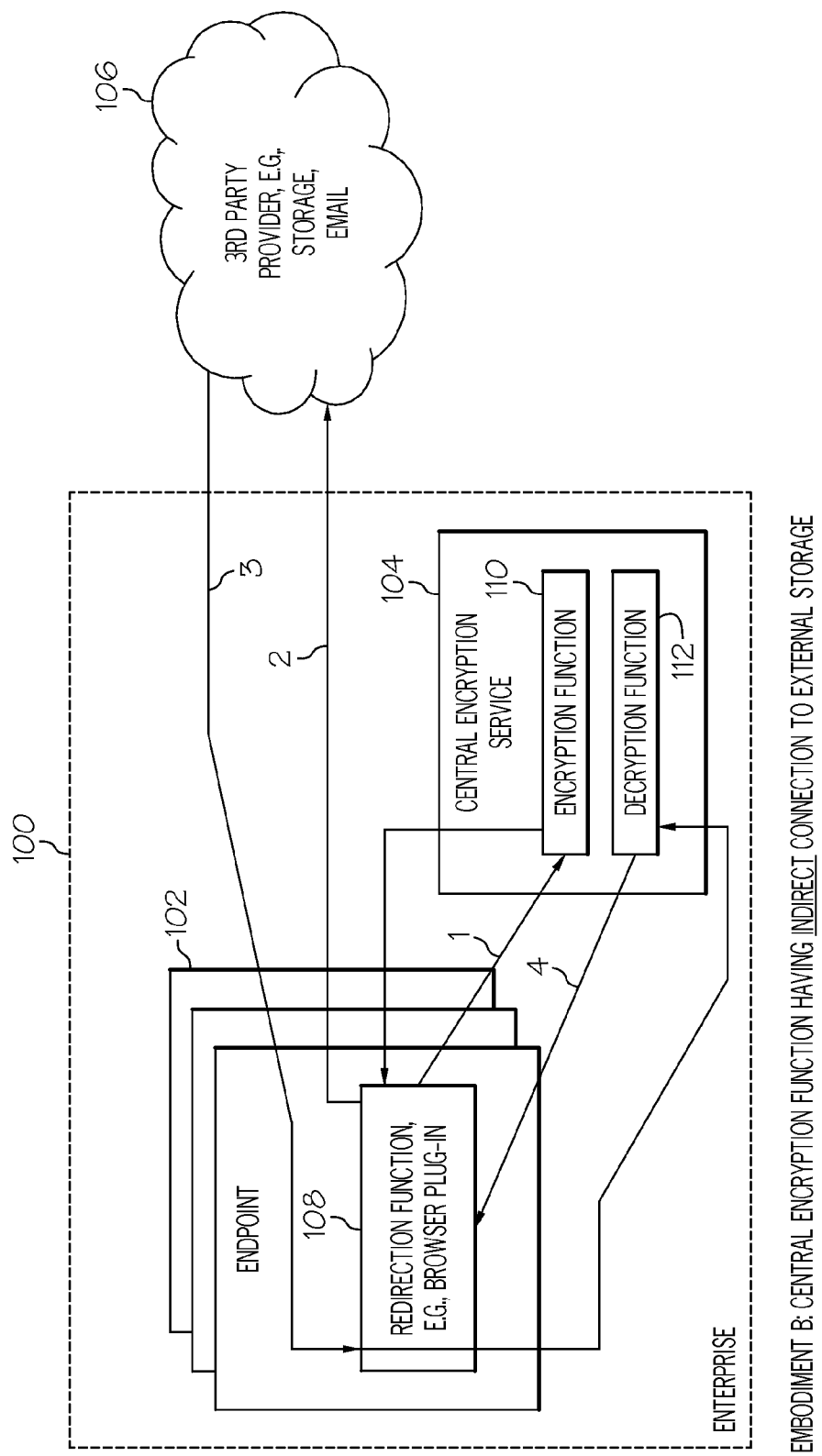
FIG. 7 depicts a system for securing information within a Cloud computing environment according to another embodiment of the present invention.

In Embodiment B, the browser sends/retrieves the encrypted information from the external storage and also communicates with the central encryption facility. The central encryption facility does not communicate with the external storage facility. A more detailed diagram of Embodiment B is shown in FIG. 7. In general, the elements of Embodiment B are similar to those of Embodiment A (e.g., endpoint 102, browser 108, CES 104, encryption function 110, decryption function 112, enterprise 100, and CSS 106. However, the flow of communications between these elements will change in Embodiment B.

Specifically, under Embodiment B, information desired to be secured will be communicated to CES 104 from endpoint 102 (arrow 1) where it will be encrypted using a previously received set of encryption keys. The encrypted information will then be communicated to endpoint 102 from CES 104 (arrow 2). Endpoint 104 will then communicate the encrypted information to CSS 106 for storage. When this information is later needed, endpoint 104 will retrieve it from CSS 106 and communicate the encrypted information to CES 104 (arrow 3). CES 104 will then decrypt the information using a set of previously received decryption keys, and then communicate the decrypted information back to endpoint 102 (arrow 4).

Figure 8:
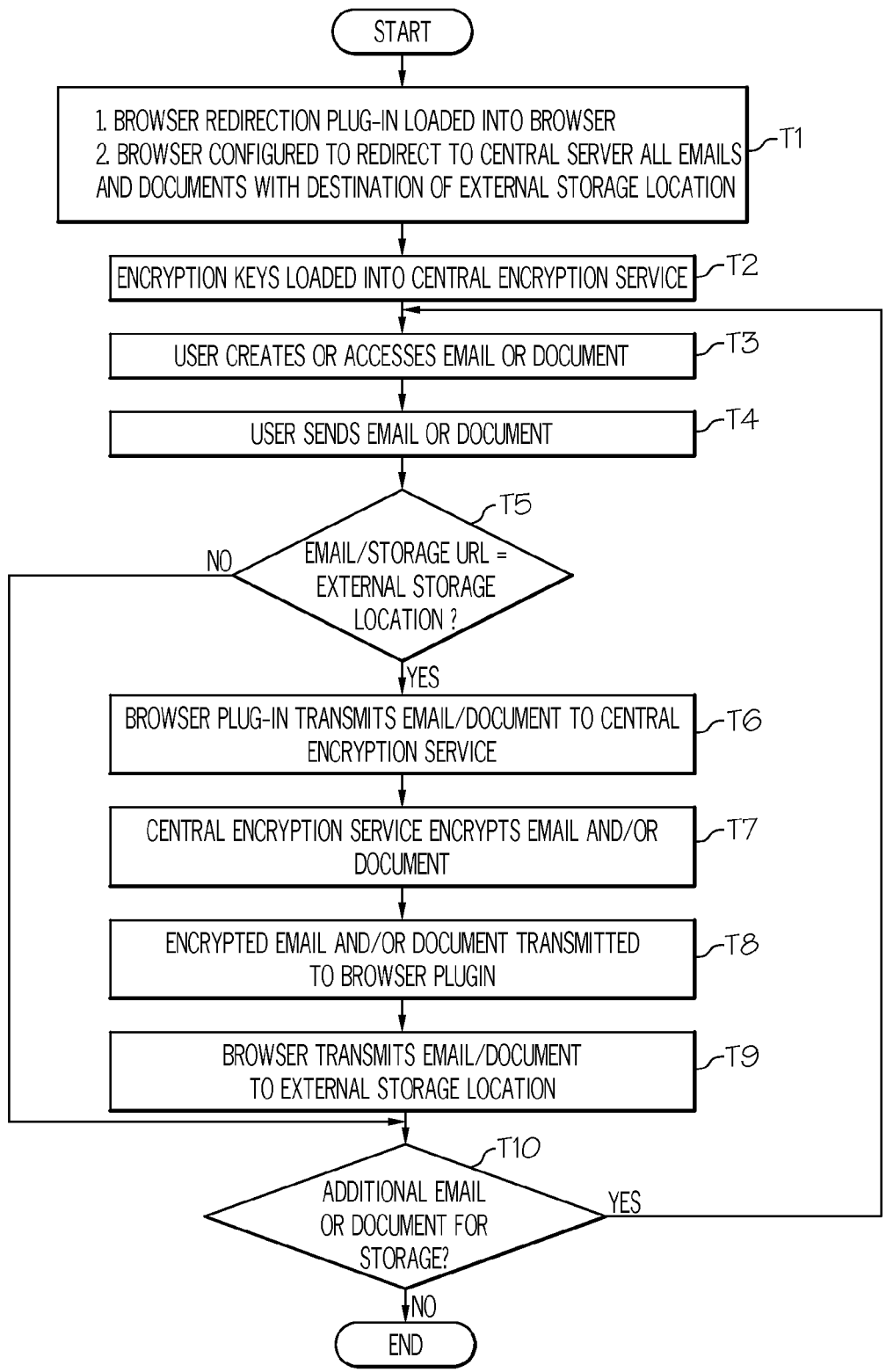
FIG. 8 depicts a method flow diagram of an encryption process under the system of FIG. 7
Figure 9:
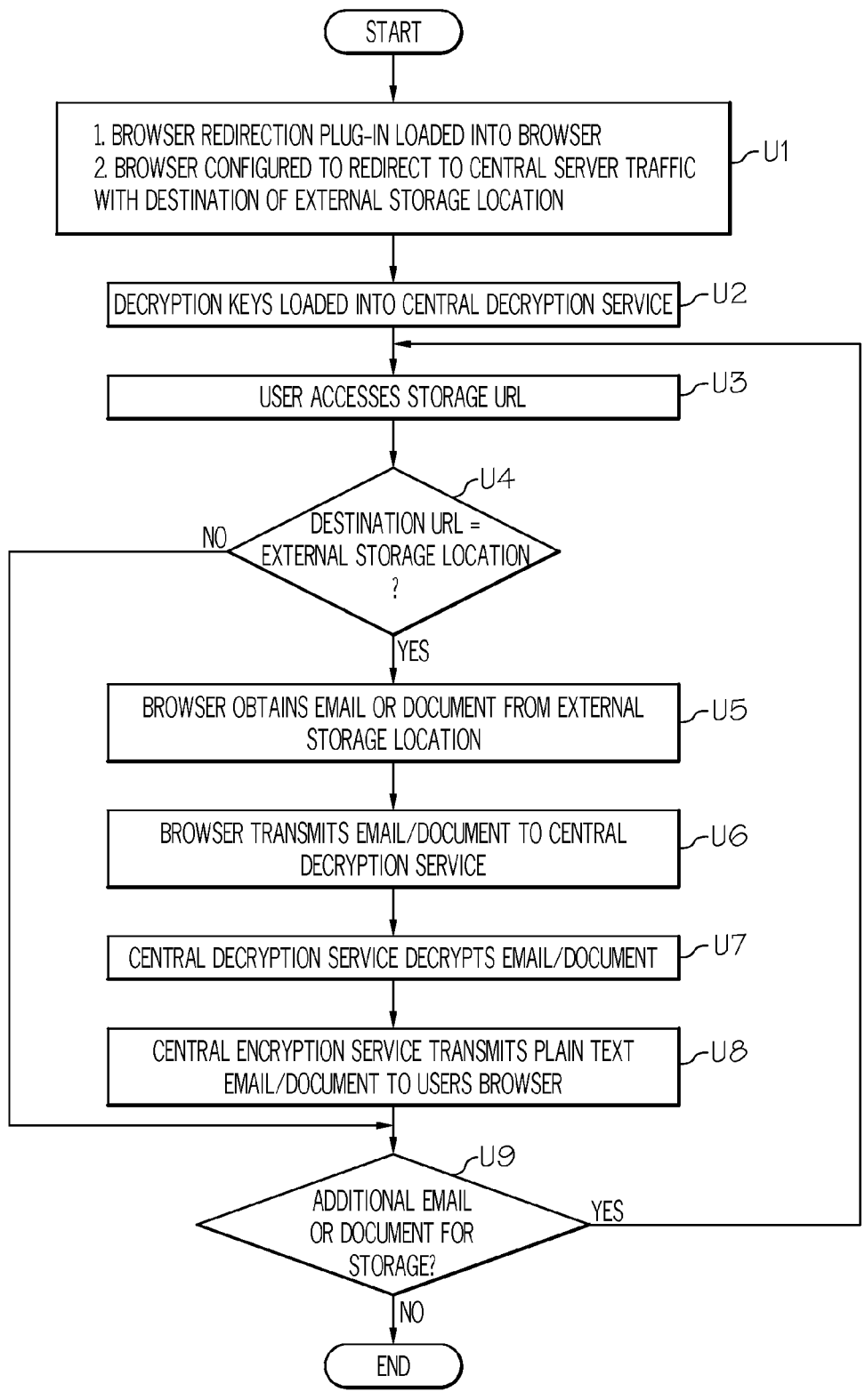
FIG. 9 depicts a method flow diagram of a decryption process under the system of FIG. 7.

A more detailed example of encryption and description is shown in the method flow diagrams of FIGS. 8 and 9, respectively. Referring first to FIG. 8 (Embodiment A: Encryption), in step T1, the "browser redirection" plug-in is loaded into the browser and is configured to redirect to the CES all emails, electronic documents, etc. (information) with a destination of the CSS. In step T2, encryption keys are loaded into the CES. In step T3, the user creates or accesses an email or document. In step T4, the user sends the email or document. In step T5, it is determined whether the storage URL references the CSS. If not, the process flows to step T10. If so, the browser plug-in transmits the email/document to the CES in step T6. In step T7, the CES encrypts the email/document using the encryption keys. In step T8, the CES transmits the encrypted email/document back to the browser plug-in. In step S9, the browser then transmits the email/document to the CSS for storage. In step T10, it is determined whether additional information needs to be secured. If not, the process ends. If so, the process returns to step T3. For those skilled in the art, it is apparent that this redirection function, performing the functions of T1, T6, T8, and T9 can be embodied in a variety of ways, such as a browser plug-in, java bean, an independent program. The use of the description "browse plug-in r" should in no way be viewed as restricting the embodiment of the redirection function and the list given is not exhaustive of the methods of embodiment for this redirection function. For those skilled in the art, it is apparent that other forms of information object reference, in addition to URL may be used, such as IP address. The use of the term URL should not be viewed as restricting the embodiment of the information object reference to a URL.

Referring now to FIG. 9 (Embodiment A: Decryption), in step U1, the "browser redirection" plug-in is loaded into the browser and is configured to redirect to the CES all emails, electronic documents, etc. (information) with a destination of the CSS. In step U2, decryption keys are loaded into the CES. In step U3, the user accesses a Uniform Resource Locator (URL). In step U4, it is determined whether it matched the CSS. If not, the process flows to step U9. If so, the browser retrieves the encrypted email/document from the CSS in step U5. In step U6, the browser transmits the encrypted email/document to the CES. In step U7, the CES decrypts the same using the decryption keys. In step U8, the CES sends the decrypted email/document to the browser. In step U9 it is determined whether additional information is being requested. If not, the process ends. If so, the process returns to step U3. For those skilled in the art, it is apparent that this redirection function, performing the functions of U1, U5, U6, U8 can be embodied in a variety of ways, such as a browser plug-in, java bean, an independent program. The use of the description "browse plug-in r" should in no way be viewed as restricting the embodiment of the redirection function and the list given is not exhaustive of the methods of embodiment for this redirection function. For those skilled in the art, it is apparent that other forms of information object reference, in addition to URL may be used, such as IP address. The use of the term URL should not be viewed as restricting the embodiment of the information object reference to a URL.

The solutions this invention provides are a way to utilize third party Cloud services (e.g., lower cost providers, etc.) for services as mail or document storage/sharing without sacrificing an enterprise's ability to protect its intellectual property. This enables secure storage of email by a third party provider with the security under the control of the email owner, not the third party. Along these lines the following functions/features can be provided:

1. Enterprise users' primary access to Cloud services is typically a web browser. To enable this invention all users would utilize a browser plug-in that would route all data, (whether email, documents, etc.) intended for storage in the Cloud to be routed to an encryption gateway within the enterprise perimeter.

2. The CES 104 provides on-the-fly encryption of data elements within email and documents. Once it has applied encryption on these elements, it transmits them into the Cloud on behalf of the user, within the appropriate storage location for that user. Since the data elements are already encrypted, they are simply stored as encrypted elements within the Cloud.

3. Encrypted data elements are also retrieved by the end user in similar but reverse fashion, requesting the data (again, could be a document, an email, any data element) via the plug-in to the CES 104. The CES 104 in turn retrieves the requested data from the Cloud and decrypts it for transmission back to the user/endpoint 102.

4. The CES 104 could use a variety of methods to encrypt the data elements, most importantly to be decided and managed by the enterprise. (e.g., private key exchange, cipher-based etc.)

While shown and described herein as an information security solution, it is understood that the invention further provides various alternative embodiments. For example, in one embodiment, the invention provides a computer-readable/useable medium that includes computer program code to enable a computer infrastructure to provide information security functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide information security. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing information security functionality. In this case, a computer infrastructure, such as computer system 12 (FIG. 1), can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claim is:

1. A method for securing information within a Cloud computing environment, comprising:

making, using at least one first computing device, a first determination whether a uniform resource locator of a first communication originating from a first endpoint matches a destination comprising a Cloud storage system;

if the first determination is no match, evaluating, using the at least one first computing device, whether additional information is requested;

if the first determination is a match, redirecting, using the at least one first computing device, to a central encryption service, the communication having the destination of the Cloud storage system, the first communication containing first information to be secured from the first endpoint at the central encryption service;

receiving, using the at least one first computing device, the first communication at the central encryption service;

encrypting, using the at least one first computing device, the first information at the central encryption service;

communicating, using the at least one first computing device, the encrypted first information to the Cloud storage system from the central encryption service;

storing, using the at least one first computing device, the encrypted first information in the Cloud storage system;

making, using at least second computing device, a second determination whether a uniform resource locator of a second communication matches the destination comprising the Cloud storage system;

if the second determination is no match, evaluating, using the at least second computing device, whether additional information is requested;

if the second determination is a match, redirecting, using the at least one second computing device, to the central encryption service, the second communication having the destination of the Cloud storage system, the second communication containing first information to be secured from a second endpoint at the central encryption service;

receiving, using the at least one second computing device, the second communication at the central encryption service;

encrypting, using the at least one second computing device, the second information at the central encryption service;

communicating, using the at least one second computing device, the encrypted second information to the Cloud storage system from the central encryption service; and storing, using the at least one second computing device, the encrypted second information in the Cloud storage system;

wherein the central encryption service operates on a system at a remote location from the first endpoint and the second endpoint; and wherein the central encryption service, the first endpoint, and the second endpoint belong to the same enterprise.

2. The method of claim 1, the information comprising an electronic document.

3. The method of claim 1, the first endpoint being a browser.

4. The method of claim 1, the first endpoint, the second endpoint, the central encryption service, and the Cloud storage system comprising at least four distinct systems, the central encryption service being implemented by a trusted third party entity.

5. The method of claim 1, further comprising:

receiving, using the at least one first computing device, a request for the information from the first endpoint on the central encryption service;

receiving, using the at least one first computing device, the first information from the Cloud storage system on the central encryption service;

decrypting, using the at least one first computing device, the first information on the central encryption service; and communicating, using the at least one first computing device, the decrypted first information to the first endpoint in fulfillment of the request.

6. The method of claim 5, further comprising receiving, using the at least one first computing device, a first set of encryption keys, the encrypting comprising encrypting the first information at the central encryption service using the first set of encryption keys, and the decrypting comprising decrypting the first information at the central encryption service using the first set of encryption keys.

7. A system for securing information within a Cloud computing environment, comprising:
a memory medium comprising instructions;
a bus coupled to the memory medium; and
a processor coupled to the bus that when executing the instructions causes the system to:
make a determination whether an internet protocol address of a first communication originating from a first endpoint matches a destination comprising a Cloud storage system;
if the first determination is no match, evaluate whether additional information is requested;
if the first determination is a match, redirect, to a central encryption service, the first communication having the destination of the Cloud storage system, the first communication containing information to be secured from the first endpoint at the central encryption service;
receive the first communication at the central encryption service;
encrypt the first information at the central encryption service;
communicate the encrypted first information to the Cloud storage system from the central encryption service;
store the encrypted first information in the Cloud storage system;
make, a second determination whether a uniform resource locator of a second communication matches the destination comprising the Cloud storage system;
if the second determination is no match, evaluate whether additional information is requested;
if the second determination is a match, redirect to the central encryption service, the second communication having the destination of the Cloud storage system, the second communication containing first information to be secured from a second endpoint at the central encryption service;
receive the second communication at the central encryption service;
encrypt the second information at the central encryption service;
communicate the encrypted second information to the Cloud storage system from the central encryption service; and
store the encrypted second information in the Cloud storage system;
wherein the central encryption service operates on a system at a remote location from the first endpoint and the second endpoint; and
wherein the central encryption service, the first endpoint, and the second endpoint belong to the same enterprise.

8. The system of claim 7, the information comprising an electronic document.

9. The system of claim 7, the first endpoint being a browser.

10. The system of claim 7, the first endpoint, the second endpoint, and the central encryption service, and the Cloud storage system comprising at least four distinct systems.

11. The system of claim 7, the system further being caused to:
receive a request for the first information from the first endpoint on the central encryption service;
receive the first information from the Cloud storage system on the central encryption service;
decrypt the first information on the central encryption service; and communicate the decrypted first information to the first endpoint in fulfillment of the request.

12. The system of claim 11, the system further being caused to receive a first set of encryption keys, the system further being caused to encrypt the first information at the central encryption service using the first set of encryption keys, and decrypt the first information at the central encryption service using the first set of encryption keys.

13. A non-transitory computer readable storage medium containing a program product for securing information within a Cloud computing environment, the non-transitory computer readable storage medium comprising program code for causing a computer to:
   make a first determination whether a uniform resource locator of a first communication originating from a first endpoint matches a destination comprising a Cloud storage system;
   if the first determination is no match, evaluate whether additional information is requested;
   if the first determination is a match, redirect, to a central encryption service, the first communication having the destination of the Cloud storage system, the first communication containing first information to be secured from the first endpoint at the central encryption service;
   receive the first communication at the central encryption service;
   encrypt the first information at the central encryption service;
   communicate the encrypted first information to the Cloud storage system from the central encryption service;
   store the encrypted first information in the Cloud storage system;
   make, a second determination whether a uniform resource locator of a second communication matches the destination comprising the Cloud storage system;
   if the second determination is no match, evaluate whether additional information is requested;
   if the second determination is a match, redirect to the central encryption service, the second communication having the destination of the Cloud storage system, the second communication containing second information to be secured from a second endpoint at the central encryption service;
   receive the second communication at the central encryption service;
   encrypt the second information at the central encryption service;
   communicate the encrypted second information to the Cloud storage system from the central encryption service;
   store the encrypted second information in the Cloud storage system; and
   wherein the central encryption service operates on a system at a remote location from the first endpoint and the second endpoint; and
   wherein the central encryption service, the first endpoint, and the second endpoint belong to the same enterprise.

14. The non-transitory computer readable storage medium containing the program product of claim 13, the information comprising an electronic document.

15. The non-transitory computer readable storage medium containing the program product of claim 13, the first endpoint being a browser.

16. The non-transitory computer readable storage medium containing the program product of claim 13, the first endpoint, the second endpoint, the central encryption service, and the Cloud storage system comprising at least four distinct systems.

17. The non-transitory computer readable storage medium containing the program product of claim 13, the computer readable medium further comprising program code for causing the computer to:
   receive a request for the first information from the first endpoint on the central encryption service;
   receive the first information from the Cloud storage system on the central encryption service;
   decrypt the first information on the central encryption service; and
   communicate the decrypted first information to the first endpoint in fulfillment of the request.

18. The non-transitory computer readable storage medium containing the program product of claim 17, the system further being caused to receive a first set of encryption keys, the system further being caused to encrypt the first information at the central encryption service using the first set of encryption keys, and decrypt the first information at the central encryption service using the first set of encryption keys.

19. A method for deploying an application for securing information within a Cloud computing environment, comprising:
   providing a computer infrastructure being operable to:
   make a first determination whether an internet protocol address of a first communication originating from a first endpoint matches a destination comprising a Cloud storage system;
   if the first determination is no match, evaluate whether additional information is requested;
   if the first determination is a match, redirect, to a central encryption service, the first communication having the destination of the Cloud storage system, the first communication containing first information to be secured from the first endpoint at the central encryption service;
   receive the first communication at the central encryption service;
   encrypt the first information at the central encryption service;
   communicate the encrypted first information to the Cloud storage system from the central encryption service;
   store the encrypted first information in the Cloud storage system;
   make, a second determination whether a uniform resource locator of a second communication matches the destination comprising the Cloud storage system;
   if the second determination is no match, evaluate whether additional information is requested;
   if the second determination is a match, redirect to the central encryption service, the second communication having the destination of the Cloud storage system, the second communication containing second information to be secured, from the second endpoint, at the central encryption service;
   receive the second communication at the central encryption service;
   encrypt the second information at the central encryption service;
   communicate the encrypted second information to the Cloud storage system from the central encryption service;
   store the encrypted second information in the Cloud storage system;
   wherein the computer infrastructure comprises at least one computer; and wherein the central encryption service operates on a system at a remote location from the first endpoint and the second endpoint; and wherein the central encryption service, the first endpoint, and the second endpoint belong to the same enterprise.

20. A method for securing information within a Cloud computing environment, comprising:

making, using at least one first computing device, a first determination whether a uniform resource locator of a first communication originating from a first endpoint matches a destination comprising the Cloud storage system;

if the first determination is no match, evaluating, using the at least one first computing device, whether additional information is requested;

if the first determination is a match, redirecting, using the at least one first computing device, to a central encryption service, the first communication having the destination of the Cloud storage system, the first communication containing information to be secured from the first endpoint at the central encryption service;

receiving, using the at least one first computing device, the first communication at the central encryption service;

encrypting, using the at least one first computing device, the first information at the central encryption service using a first set of previously received encryption keys;

communicating, using the at least one first computing device, the encrypted first information to the first endpoint from the central encryption service;

communicating, using the at least one first computing device, the encrypted first information from the first endpoint to the Cloud storage system for storage;

storing, using the at least one first computing device, the encrypted first information in the Cloud storage system;

making, using at least one second computing device, a second determination whether a uniform resource locator of a second communication, originating from a second endpoint, matches the destination comprising the Cloud storage system;

if the second determination is no match, evaluating, using the at least one second computing device, whether additional information is requested;

if the second determination is a match, redirecting, using the at least one second computing device, to the central encryption service, the second communication having the destination of the Cloud storage system, the second communication containing second information to be secured, from the second endpoint, at the central encryption service;

receiving, using the at least one second computing device, the second communication at the central encryption service;

encrypting, using the at least one second computing device, the second information at the central encryption service using a second set of previously received encryption keys;

communicating, using the at least one second computing device, the encrypted second information to the second endpoint from the central encryption service;

communicating, using the at least one second computing device, the encrypted second information from the second endpoint to the Cloud storage system for storage; and storing, using the at least one second computing device, the encrypted second information in the Cloud storage system;

wherein the central encryption service operates on a system at a remote location from the first endpoint and the second endpoint; and wherein the central encryption service, the first endpoint, and the second endpoint belong to the same enterprise.

21. The method of claim 20, the information comprising an electronic document, and the first endpoint being a browser.

22. The method of claim 20, the first endpoint, the second endpoint, the central encryption service, and the Cloud storage system comprising at least four distinct systems.

23. The method of claim 20, further comprising:

receiving, using the at least one first computing device, the encrypted first information from the Cloud storage system at the first endpoint;

communicating, using the at least one first computing device, the encrypted information to the central encryption service;

decrypting, using the at least one first computing device, the information on the central encryption service using the first set of previously received encryption keys; and communicating, using the at least one first computing device, the decrypted first information to the first endpoint from the central encryption service.

24. A system for securing information within a Cloud computing environment, comprising:

a memory medium comprising instructions;

a bus coupled to the memory medium; and a processor coupled to the bus that when executing the instructions caused the system to:

make a determination whether an internet protocol address of a communication originating from a first endpoint matches a destination comprising a Cloud storage system;

if the determination is no match, evaluate whether additional information is requested;

if the determination is a match, redirect, to a central encryption service, the first communication having the destination of the Cloud storage system, the first communication containing first information to be secured from the first endpoint at the central encryption service;

receive the first communication at the central encryption service;

encrypt the first information at the central encryption service;

communicate the encrypted first information to the first endpoint from the central encryption service;

communicate the encrypted first information from the first endpoint to the Cloud storage system for storage;

store the encrypted first information in the Cloud storage system;

make a second determination whether a uniform resource locator of a second communication, originating from a second endpoint, matches the destination comprising the Cloud storage system;

if the second determination is no match, evaluate whether additional information is requested;

if the second determination is a match, redirect to the central encryption service, the second communication having the destination of the Cloud storage system, the second communication containing second information to be secured, from the second endpoint, at the central encryption service;

receive the second communication at the central encryption service;

encrypt the second information at the central encryption service using a second set of previously received encryption keys;

communicate the encrypted second information to the second endpoint from the central encryption service;

communicate the encrypted second information from the second endpoint to the Cloud storage system for storage; and store the encrypted second information in the Cloud storage system;

wherein the central encryption service operates on a system at a remote location from the first endpoint and the second endpoint;

wherein the central encryption service, the first endpoint, and the second endpoint belong to the same enterprise.

25. The system of claim 24, the information comprising an electronic document, and the first endpoint being a browser.

26. The system of claim 24, the first endpoint, the second endpoint, the central encryption service, and the Cloud storage system comprising at least four distinct systems.

27. The system of claim 24, the system further being caused to:

receive the encrypted first information from the Cloud storage system at the first endpoint;

communicate the encrypted first information to the central encryption service;

decrypt the first information on the central encryption service; and communicate the decrypted first information to the first endpoint from the central encryption service.

28. A non-transitory computer readable storage medium containing a program product for securing information within a Cloud computing environment, the computer readable storage medium comprising program code for causing a computer to:

make a determination whether a uniform resource locator of a communication originating from a first endpoint matches a destination comprising a Cloud storage system;

if the determination is no match, evaluate whether additional information is requested;

if the determination is a match, redirect, to a central encryption service, the first communication having the destination of the Cloud storage system, the first communication containing first information to be secured from the first endpoint at the central encryption service;

receive the first communication at the central encryption service;

encrypt the first information at the central encryption service;

communicate the encrypted first information to the first endpoint from the central encryption service;

communicate the encrypted first information from the first endpoint to the Cloud storage system for storage;

storing the encrypted first information in the Cloud storage system;

make a second determination whether a uniform resource locator of a second communication, originating from a second endpoint, matches the destination comprising the Cloud storage system;

if the second determination is no match, evaluate whether additional information is requested;

if the second determination is a match, redirect to the central encryption service, the second communication having the destination of the Cloud storage system, the second communication containing information to be secured, from the second endpoint, at the central encryption service;

receive the second communication at the central encryption service;

encrypt the second information at the central encryption service using a second set of previously received encryption keys;

communicate the encrypted second information to the second endpoint from the central encryption service;

communicate the encrypted second information from the second endpoint to the Cloud storage system for storage;

store the encrypted second information in the Cloud storage system;

wherein the central encryption service operates on a system at a remote location from the first endpoint and the second endpoint; and wherein the central encryption service, the first endpoint, and the second endpoint belong to the same enterprise.

29. The non-transitory computer readable storage medium containing a program product of claim 28, the first information comprising an electronic document, and the first endpoint being a browser.

30. The non-transitory computer readable storage medium containing a program product of claim 28, the first endpoint, the second endpoint, the central encryption service, and the Cloud storage system comprising at least four distinct systems.

31. The non-transitory computer readable storage medium containing a program product of claim 28, the computer readable storage medium further comprising program code for causing the computer to:

receive the encrypted first information from the Cloud storage computer readable medium containing a program product at the endpoint;

communicate the encrypted first information to the central encryption service;

decrypt the first information on the central encryption service; and communicate the decrypted first information to the first endpoint from the central encryption service.

32. A method for deploying an application for securing information within a Cloud computing environment, comprising:

providing a computer infrastructure being operable to:

make a first determination whether an internet protocol address of a first communication originating from a first endpoint matches a destination comprising a Cloud storage system;

if the first determination is no match, evaluate whether additional information is requested;

if the first determination is a match, redirect, to a central encryption service, the first communication having the destination of the Cloud storage system, the first communication containing first information to be secured from the first endpoint at the central encryption service;

receive the first communication at the central encryption service;

encrypt the first information at the central encryption service;

communicate the encrypted first information to the first endpoint from the central encryption service;

communicate the encrypted first information from the first endpoint to the Cloud storage system for storage;

store the encrypted first information in the Cloud storage system;

make a second determination whether a uniform resource locator of a second communication, originating from a second endpoint, matches the destination comprising the Cloud storage system;

if the second determination is no match, evaluate whether additional information is requested;

if the second determination is a match, redirect to the central encryption service, the second communication having the destination of the Cloud storage system, the second communication containing information to be secured from the second endpoint at the central encryption service;

receive the second communication at the central encryption service;

encrypt the second information at the central encryption service;

communicate the encrypted second information to the second endpoint from the central encryption service;

communicate the encrypted second information, from the second endpoint, to the Cloud storage system for storage; and store the encrypted second information in the Cloud storage system;

wherein the computer infrastructure comprises at least one computer;

wherein the central encryption service operates on a system at a remote location from the first endpoint and the second endpoint;

wherein the central encryption service, the first endpoint, and the second endpoint belong to the same enterprise.

* * * * *